United States Patent
Ungar et al.

(10) Patent No.: US 10,963,330 B2
(45) Date of Patent: Mar. 30, 2021

(54) CORRELATING FAILURES WITH PERFORMANCE IN APPLICATION TELEMETRY DATA

(71) Applicant: Microsoft Technology Licensing, LLC, Redmond, WA (US)

(72) Inventors: Adam Ungar, Tel-Aviv (IL); Anton Fritz, Tel-Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 452 days.

(21) Appl. No.: 15/822,104

(22) Filed: Nov. 24, 2017

(65) Prior Publication Data

US 2019/0163546 A1 May 30, 2019

(51) Int. Cl.
*G06F 11/07* (2006.01)
*G06F 11/34* (2006.01)

(52) U.S. Cl.
CPC ........ *G06F 11/079* (2013.01); *G06F 11/0706* (2013.01); *G06F 11/0751* (2013.01); *G06F 11/0778* (2013.01); *G06F 11/34* (2013.01); *G06F 11/3447* (2013.01); *G06F 11/3452* (2013.01); *G06F 11/3476* (2013.01); *G06F 2201/865* (2013.01)

(58) Field of Classification Search
CPC ............... G06F 11/079; G06F 11/0751; G06F 11/0706; G06F 11/0778; G06F 11/34; G06F 11/3447; G06F 11/3452; G06F 11/3476
See application file for complete search history.

(56) References Cited

U.S. PATENT DOCUMENTS

| | | | |
|---|---|---|---|
| 6,754,664 B1 | 6/2004 | Bush | |
| 7,210,073 B1 | 4/2007 | Landwehr et al. | |
| 7,865,888 B1 * | 1/2011 | Qureshi | G06F 11/079 717/168 |
| 8,001,527 B1 * | 8/2011 | Qureshi | G06N 5/048 717/120 |
| 9,672,123 B2 | 6/2017 | Duggana et al. | |
| 10,732,957 B2 * | 8/2020 | Dattatri | G06F 8/61 |

(Continued)

OTHER PUBLICATIONS

"Informatica Proactive Monitoring for PowerCenter Operations", https://kb.informatica.com/proddocs/Product%20Documentation/4/PMPO_25_SolutionsGuide_en.pdf, Published on: Dec. 2012, 95 pages.

(Continued)

*Primary Examiner* — Gabriel Chu
*Assistant Examiner* — Indranil Chowdhury
(74) *Attorney, Agent, or Firm* — Fiala & Weaver P.L.L.C.

(57) ABSTRACT

Embodiments relate to finding correlations between periods of performance degradation of an application and failure rates of the application. Telemetry data reports results of operations performed by the application. The telemetry data is parsed to identify periods of performance degradation of the operations. Performance measures of successful operations during an identified period are aggregated, and performance measures of failed operations during the identified period are aggregated. For the identified periods, conclusions about positive and negative correlation between failures of the operation and degraded performance of the operations are derived based on the aggregate measures of success and failure and based on rates of failure of the operation during the periods.

15 Claims, 11 Drawing Sheets

(56) References Cited

U.S. PATENT DOCUMENTS

| | | | |
|---|---|---|---|
| 2005/0251802 A1* | 11/2005 | Bozek | G06F 9/5077 |
| | | | 718/1 |
| 2007/0101202 A1* | 5/2007 | Garbow | G06F 11/008 |
| | | | 714/47.2 |
| 2010/0229023 A1* | 9/2010 | Gross | G06F 11/0724 |
| | | | 714/2 |
| 2011/0029882 A1 | 2/2011 | Jaisinghani | |
| 2012/0144242 A1* | 6/2012 | Vichare | G06F 11/0751 |
| | | | 714/39 |
| 2015/0227100 A1* | 8/2015 | Uwatoko | G03G 15/55 |
| | | | 399/9 |
| 2015/0323926 A1* | 11/2015 | Wang | G05B 23/0216 |
| | | | 700/19 |
| 2016/0274966 A1* | 9/2016 | Garvey | G06F 11/0706 |
| 2016/0292065 A1* | 10/2016 | Thangamani | G06F 11/079 |
| 2016/0300148 A1* | 10/2016 | Kelly | G06N 5/048 |
| 2016/0350671 A1* | 12/2016 | Morris, II | G05B 23/0229 |
| 2017/0006135 A1* | 1/2017 | Siebel | G06F 16/283 |
| 2017/0054610 A1* | 2/2017 | Vangala | G06F 11/079 |
| 2017/0104658 A1* | 4/2017 | Sykes | H04L 41/064 |
| 2017/0131710 A1* | 5/2017 | Chen | G05B 23/0283 |
| 2017/0132057 A1* | 5/2017 | Zhang | G06F 11/0709 |
| 2017/0278133 A1* | 9/2017 | Corrado | G06Q 30/0255 |
| 2018/0276063 A1* | 9/2018 | Mendes | G06F 11/0793 |
| 2019/0057006 A1* | 2/2019 | Boyapalle | G06F 11/3065 |
| 2020/0351172 A1* | 11/2020 | Vasseur | H04L 41/147 |

OTHER PUBLICATIONS

"Amazon CloudWatch User Guide", https://web.archive.org/web/20160823160014/http:/docs.aws.amazon.com/AmazonCloudWatch/latest/monitoring/acw-ug.pdf, Published on: Aug. 23, 2016, pp. 1-213.

"Using Oracle Enterprise Manager for Monitoring and Detection", https://docs.oracle.com/cd/B12037_01/server.101/b10726/monitor.htm, Published on: 2003, 15 pages.

Matson, John, "How to monitor Cassandra performance metrics", https://www.datadoghq.com/blog/how-to-monitor-cassandra-performance-metrics/, Published on: Dec. 3, 2015, 14 pages.

\* cited by examiner

CORRELATING FAILURES WITH PERFORMANCE IN APPLICATION TELEMETRY DATA

BACKGROUND

For most software applications, achieving optimal speed is a never-ending goal of users, developers, and administrators. Speed is particularly important for interactive applications, where users must wait for tasks to complete before proceeding with their activities. Slow software components may also have collateral effects such as disrupting carefully designed workflows. Furthermore, software slowdowns may result in underutilization of expensive hardware resources. For instance, a processor waiting for a failed operation to timeout may be idle while other work is queued and waiting to be executed. In addition, poor performance may prevent some applications from completing within practical time limits, for example applications that process large datasets or that perform long-running compute-intensive algorithms.

One way that software performance can be improved is by analyzing diagnostic data such as telemetry logs. However, the complexity of applications and the voluminous amounts of telemetry data that can be generated by even a single application make it difficult to tease performance-relevant insights out of telemetry data. A period of poor performance might be evident in a stream of telemetry data, but the cause, if any, is often hard to diagnose. Many factors can influence performance of software, and variation in data being processed can invoke different execution paths and produce varying execution times. External components supplying necessary data may be lagging.

Developers are naturally interested in performance problems that are caused by software failures or errors that may appear in an application's telemetry data. However, isolating intrinsic causes from extrinsic causes is difficult. As noted above, a performance problem may have multiple potential causes. Furthermore, failures and performance can be positively and negatively correlated. That is, in some cases, failures might improve performance, and in other cases failures might decrease performance. Even a same type of failure might improve performance under some conditions (e.g., specific input data, time of day, external factors) and might harm performance under other conditions. It is also possible for a given type of failure to have no effect on performance.

There have been many techniques used to identify performance problems, and many methods have been employed to identify software failures. However, as observed only by the inventors, there is an unmet need to be able to understand, within a well-defined telemetry stream, the causal relationship between fluctuations in a rate of a particular application failure and detected periods of performance degradation of the application. It may be desirable to know whether a rate of a given failure in telemetry data is positively correlated with a specific performance degradation, whether it is negatively (inversely) correlated, or whether it is not correlated at all. Techniques for correlating failure rates and performance degradations are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to finding correlations between periods of performance degradation of an application and failure rates of the application. Telemetry data reports results of operations performed by the application. The telemetry data is parsed to identify periods of performance degradation of the operations. Performance measures of successful operations during an identified period are aggregated, and performance measures of failed operations during the identified period are aggregated. For the identified periods, conclusions about positive and negative correlation between failures of the operation and degraded performance of the operations are derived based on the aggregate measures of success and failure and based on rates of failure of the operation during the periods.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
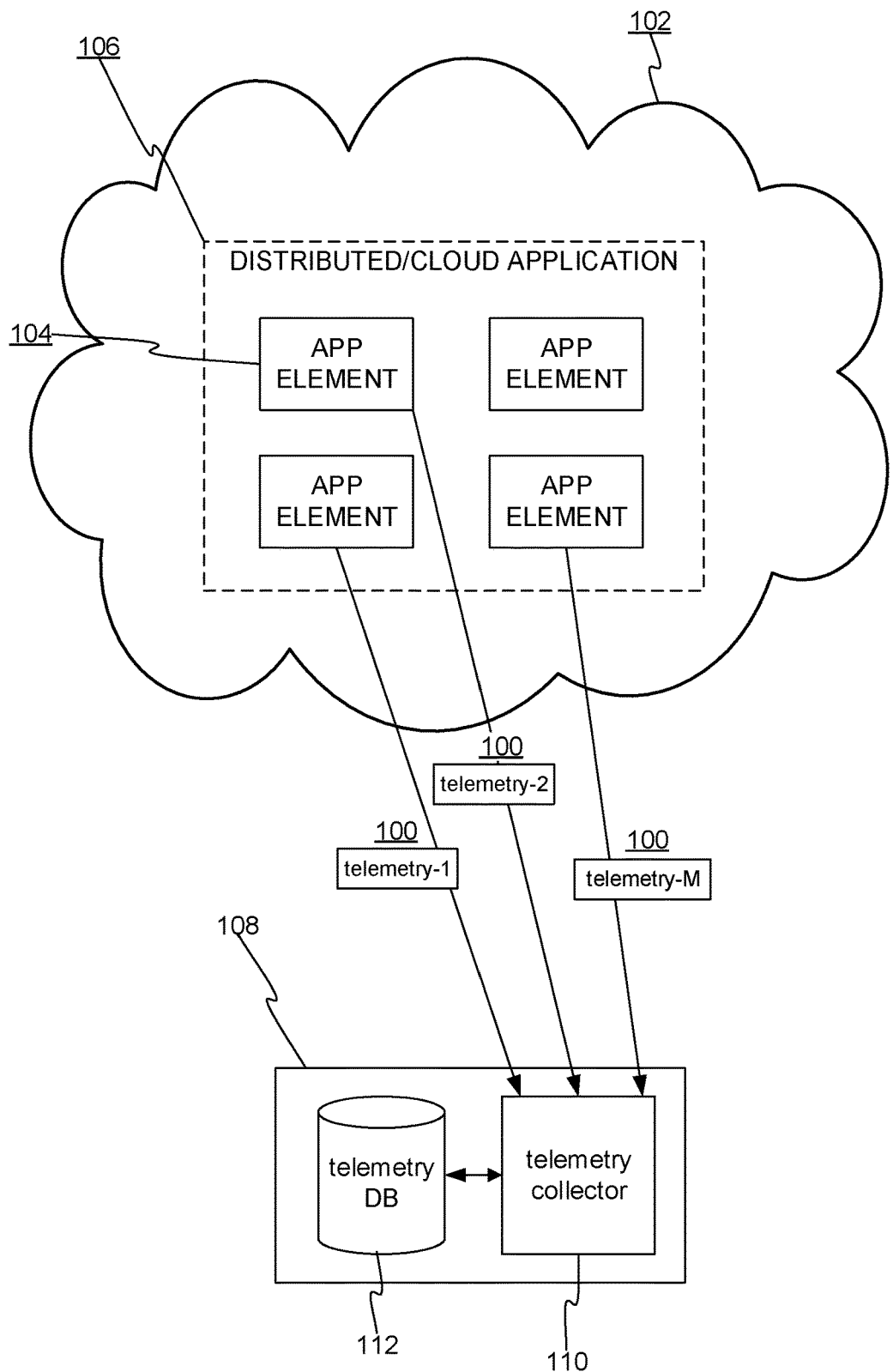
FIG. 1 shows an example of telemetry data flowing from sources to a collection point.

FIG. 1 shows an example of telemetry data flowing from sources to a collection point. A compute cloud 102 hosts instances or elements 104 of a distributed application 106. Each application element 104 forwards telemetry reports 100 to a telemetry service 108. A telemetry collector 110 collects the telemetry reports 100 and stores them in a telemetry database 112. The telemetry reports may be collections of telemetry data that include data (e.g., trace outputs) from many applications. In one embodiment, the telemetry data consists of records of respective events or operations performed by the application. Event records may include may fields of data, but at the least should include fields that indicate performance of the respective operations (e.g., duration, latency, speed, etc.), identifiers identifying the operations, and one or more fields that can be interpreted as indicating whether a corresponding operation succeeded or failed. As discussed below, other fields may serve as signals for statistically predicting probabilities of failure rates, for instance parameters passed to an operation, metadata related to the operation, state of the application at the time of the operation, etc.

In one embodiment, heterogenous sources of telemetry data that bear on an application's performance may be collected and then collated and synchronized by the telemetry service 108. For instance, collected telemetry might include system log files with timestamped entries of operating system observations of events or operations invoked or performed by the application, application log or trace files with timestamped entries generated by the application (or element/instance) in correspondence with its activity, logs from web services, and so on. The telemetry service 108 may normalize and synchronize the telemetry data to form a cohesive diagnostic event stream chronology, preferably with timestamped entries.

For distributed applications, the telemetry service 108 may take telemetry reports from respective application instances and form a single dataset that treats the distributed application as a single unit; event records may or may not indicate their source, e.g., which application instances, hosts, cloud services, etc., generated which event records. It is also possible that the telemetry data to be used for failure-performance correlation may be from a single application or device. What is significant is that the telemetry data include information recorded during attempts to perform operations and that the telemetry data include operation information that identifies which operations were performed, failure information that indicates whether respective operations succeeded or failed, performance information that reflects measures of performance of the operations, and perhaps dates/times of the operations.

Figure 2:
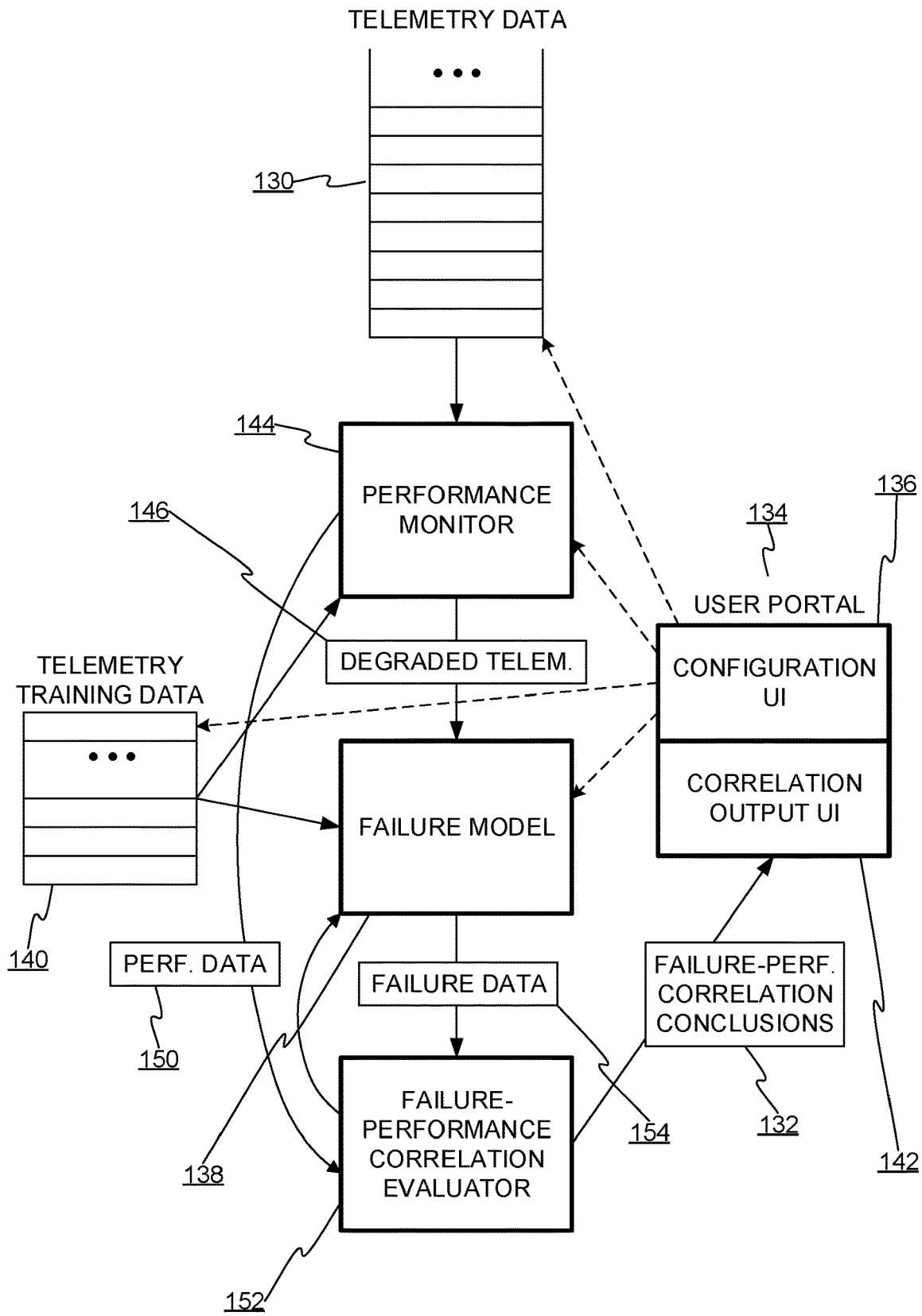
FIG. 2 shows a system for processing telemetry data to generate conclusions about correlations between detected performance degradations and failures in the telemetry data.

FIG. 2 shows a system for processing telemetry data 130 to generate conclusions 132 about correlations between detected performance degradations of an application and failures in the telemetry data 130. How the outputted conclusions 132 are generated and presented is described below.

A user portal 134 is provided to enable a user to configure operation of the system and to view results such as the conclusions 132. The user portal 134 may have two main user interface sections. A configuration user interface 136 enables a user to configure: the telemetry data 130, how the telemetry data 130 is to be evaluated to measure performance and tolerance levels, a statistical model 138 for evaluating failure rate, telemetry training data 140 for the model 138, and other features of the system. A correlation output user interface 142 presents the correlation conclusions 132 in various formats, as discussed with reference to FIGS. 9 and 10.

The telemetry data 130 may be any type of telemetry data discussed above. The configuration user interface 136 may be used to interactively select which telemetry sources are to be used, what fields/columns in raw telemetry data are needed, filters to select a subset of telemetry data, what constitutes a failure and an operation, etc. The configuration user interface 136 may also be used to identify a key performance indicator (KPI), for example a "duration" or "time-to-complete" field in the telemetry data. The configuration user interface 136 may also be used to define, in terms of one or more fields of the telemetry data 130, the conditions that are deemed to be a failure. For example, a failure might be defined to be a particular set of return codes for an operation. The format of the telemetry data 130 used to evaluate current or recent performance of the relevant application should have the same format as the telemetry training data 140.

Regarding user configuration of operations, the user can configure how the system will identify operations and failures in the telemetry data. Examples of operation identification rules are:

1) the telemetry has a field that uniquely identifies an operation, such as a field called "operation ID", (common practice in performance monitoring systems); or 2) a unique operation is identified by a combination of fields, for example the fields "resource" and "command" in the telemetry item, where each unique combination defines an operation like "resource"="MyWebServer" and "command"="GetInfo".

Similarly, the user can provide failure identification rules, such as:

1) the value of the field "success" in the telemetry item="False"; or 2) a combination of fields, e.g., if the value of the field "completed"="False" OR the value of the field "response code">200.

Correlation flows discussed below can be performed on a per-operation basis. Heterogeneous data can still be used in other correlation flows. For example, if an increase in failure rate for all the data is detected—and not just for specific operations—then the data can be analyzed without separating to specific operations.

Assuming that performance criteria for a performance monitor 144 has been configured, that the telemetry data 130 has been defined and made accessible, that the failure model 138 has been trained with telemetry training data 140 and provided with a tolerance level (e.g., "strict", "medium", or "lenient"), the system functions as follows.

The telemetry data 130 is fed to the performance monitor 144. In one embodiment, the system operates online; the telemetry data 130 is streamed as it becomes available. In another embodiment, the telemetry data may be manually initiated as a batch process. Online implementations may be capable of providing failure-performance feedback as degraded performance of the application is occurring. In either case, event records in the telemetry data 130 may be assumed to be in chronological order, or may be so ordered according to normalized timestamps of the respective records.

The performance monitor 144 parses the telemetry data to identify periods of time whose telemetry records, in aggregate, show sufficient performance degradation to justify correlation analysis (determining performance degradation is described further below). Degradation periods can be delineated using several techniques. The performance monitor 144 may look at a sliding time window of the telemetry data 130, for instance an hour or day, and keep checking to see whether the aggregate performance of the current window has reached a level of degradation. In another embodiment, the telemetry data is divided into consecutive periods (e.g., one-hour increments) and each period is analyzed for potential degradation. The performance monitor 144 may instead identify extents of periods of sufficient degradation. That is, degradation periods may be periods found to have continuous aggregate degradation. Such a dynamic degradation period may be any length of time during which aggregate performance is found to be degraded. Such analysis may be based on small timeslices of telemetry data; if a slice is found to have aggregate degradation, the slice is added, the aggregate performance of adding a next slice is checked, and slices keep getting added as long as their aggregate has sufficient degradation.

Performance degradation is determined based on a user-specified performance condition defined with respect to aggregate performance of an arbitrary period. During initial configuration, the configuration user interface 136 is used to specify a performance condition that defines sufficient/insufficient performance. The performance condition is defined in terms of one or more performance fields in the telemetry data 130. The performance condition may define (i) an aggregate performance measure and (ii) a degradation condition that it must satisfy to signal performance degradation.

The aggregate performance measure (of an arbitrary telemetry period), may be, for instance, average event duration, mean event duration, weighted average duration (weight increases with recency of events), etc. The condition may be based on the aggregate performance measure of the telemetry training data 140. For example, the aggregate performance measure might be "average duration".

The objective of the degradation-testing condition is to determine when performance is poor compared to the baseline expected performance. The degradation-testing condition may be, for instance, a comparison of the average duration of a measured period with the average duration of the training data (baseline performance). A degradation condition might be: performance is considered to be "degraded" during a period in the telemetry data 130 when the average duration (aggregate performance) thereof exceeds the baseline (training data) average duration, perhaps by a threshold amount or ratio. Complex conditions can be specified, and other measures of aggregate performance and other baseline comparisons may be used. For example, degradation may be deemed to have occurred when aggregate telemetry performance is worse than some percentile of baseline performance. Supposing that Y is the 90th percentile baseline duration (i.e. a number of seconds where 90% of the relevant historical data shows a duration that is <Y) and supposing X is the average duration in the current window, a performance degradation criterion may be defined as X>Y, i.e., the average duration of the current window shows a poorer performance than 90% of all relevant historical telemetry items. Other expressions for a performance degradation condition might be:

1) current 90th percentile>2 seconds AND average duration>baseline duration;

2) current 75th percentile>=baseline 90th percentile; or 3) current average duration>baseline 90th percentile duration OR current average>1.5*baseline duration.

Degradation might instead be defined as a ratio of the baseline performance; e.g., degradation occurs when aggregate performance is 1.5 times worse than the baseline performance. In one embodiment, baseline performance is dynamically determined (and/or updated) from the flow of telemetry data 130. Preferably, the baseline performance is determined from telemetry data that corresponds to normal or non-degraded performance. Such data can be statistically inferred or manually labeled.

In any case, the degradation condition (baseline comparison) is used by the performance monitor 144 to identify periods of degraded performance (in the telemetry data 130) that merit failure correlation analysis, and as a consequence, the corresponding affected/degraded telemetry data 146 is passed the failure model 138, and performance data 150 (e.g., baseline aggregate performance, degraded aggregate performance, etc.) is passed to a failure-performance correlation evaluator 152, as discussed later.

The failure model 138 receives the degraded telemetry data 146 and performs failure analysis on same. The failure model 138 is initially configured via the configuration user interface 136. The configuration may involve selecting a type of statistical model, inputting a user-defined failure condition, setting a "significance threshold", and training the failure model 138 with the telemetry training data 140.

The user-defined failure condition specifies how to determine which telemetry records correspond to failed operations and which correspond to successful operations. The failure condition might be as simple as a definition of a set of status/return codes. For instance, in the case of Hypertext Transfer Protocol (HTTP) operations, "failure" might be defined by the user to be status codes in the 300's, 400's, and 500's, or, any status code that is not in the 200's. Failure may be defined as a Boolean/mathematical function of several fields of a telemetry event record. For instance, failures might be defined to be: records having a first type of event/operation and a particular failure code, and records having a second type of event/operation and another failure code. A failure rate for the affected/degraded telemetry data 146 may be computed as a ratio of failures to non-failures (during the degradation period), a rate of failures per unit of time, a rate of failures relative to total operations/events, a percentage of time (in the degradation period) that failures per time-unit exceeded a threshold percentage, etc. For discussion, failure rate will be the proportion of failures to total operations/events, or, the proportion of records in the degraded telemetry data 146 that indicate failure.

The basic function of the failure model 138 is to calculate the failure rate from the affected/degraded telemetry data 146, decide if the failure rate is significant (i.e., exceeds a significance threshold mentioned above), and if so, compute a statistical probability of the failure rate to determine if the failure rate is expected or unexpected. A range of model types may be used. A simple model may be a statistical model that calculates the failure rate for any operation. Another simple approach that works well for non-seasonal data is to use the outlier detection of the BoxPlot, the Adjusted BoxPlot, or the ZScore algorithm, which are described elsewhere. A slightly more complex model might be a weighted average of sliced data. The training data is sliced according to time, and more weight is given to more recent slices and less weight to older slices. The weighted average of the failure rate is calculated. A complex learning algorithm may be used. These are typically complex models that break the training data into slices according to time. Each slice is aggregated, and a model such as the ARIMA/SARIMA model is employed to help account for seasonality and trends in the data.

For applications with a time-invariant failure rate (the failure rate is unchanged throughout the hour/day/week), the first type of model will efficiently provide satisfactory conclusions. For applications with an expected seasonal behavior (e.g., more failures on Sunday at 1 p.m. due to some operation like deployment), the last type of model will be ideal.

Regarding the initial significance/non-significance determination, the failure model 138 decides if the failure rate meets the significance threshold. If so, the failure rate is deemed "significant". The significance threshold may be user-defined. In one embodiment, the configuration user interface 136 presents selectable categories such as "lenient", "normal", and "strict", to specify different acceptability levels of failure-rate deviation. The significance threshold may be specified in terms of the failure rate itself and/or in terms of a baseline failure rate, which can be computed from the training data and/or cumulatively derived from the analyzed telemetry data 130. A lenient mode might correspond to when be large failure-rate differences are expected (by the user), and hence degradation correlation analysis might be needed only when there are significant changes in the failure rate. For example, the lenient significance might be: the failure rate >50% and the failure rate is at least 3 times the original or baseline failure rate. The strict mode might correspond to when the relevant application is expected to be stable and large differences in failure rate are not expected. For example, if the strict significance mode might be: the failure rate >=2% and the failure rate change is at least 1.1× the original or baseline failure rate. Dynamic, default, or complex significance thresholds may be used.

If the failure model 138 decides that there is significant change of failure rate in the degraded telemetry data 146, then the failure model 138 determines whether the failure rate is statistically expected. As noted above, the failure model 138 may be trained with the telemetry training data 140 to enable probabilistic analysis of failure rates. Any type of known learning machine algorithm may be used. Preferably, the algorithm maps feature vectors to probabilities. That is, the algorithm uses each telemetry field that can possibly be correlated with failure behavior as a predictive field (feature in a feature vector)). The predictive fields may be selected by the user. Time and date may be particularly useful prediction factors, since the probability of failure may regularly vary with time (e.g., failure rate regularly increases or decreases during certain times/days). The probability of the failure rate of the degraded telemetry data is used to conclude whether the failure rate is expected or not. The failure model 138 outputs its failure data to the failure-performance correlation evaluator 152. Specifically, the failure model 138 outputs failure data 154 that indicates whether (i) the failure rate increased significantly, and was unexpected (probabilistically unlikely), (ii) the failure rate decreased significantly, and was unexpected, or (iii) the failure rate did not increase or decrease significantly, or it did but the change was statistically expected.

The failure-performance correlation evaluator 152 uses the performance data 150, the failure data 154, and possibly recalculations of either from their respective sources, to decide whether and how the user-defined failure is correlated with performance degradation. That is to say, based on baseline and degraded performance measures, and based on failure rate significance and/or expectancy, the correlation evaluator 152 may generate the failure-performance correlation conclusions 132. Such a conclusion might be one of: (1) the degradation was caused by failures, (2) the degradation was caused by successes, or (3) the degradation is not related to the relevant success/failure condition in the telemetry data. In some embodiments, each of these possibilities are considered. Details of how the performance data 150 and failure data 154 can be used to derive correlation conclusions are discussed below with reference to FIG. 8.

Figure 3:
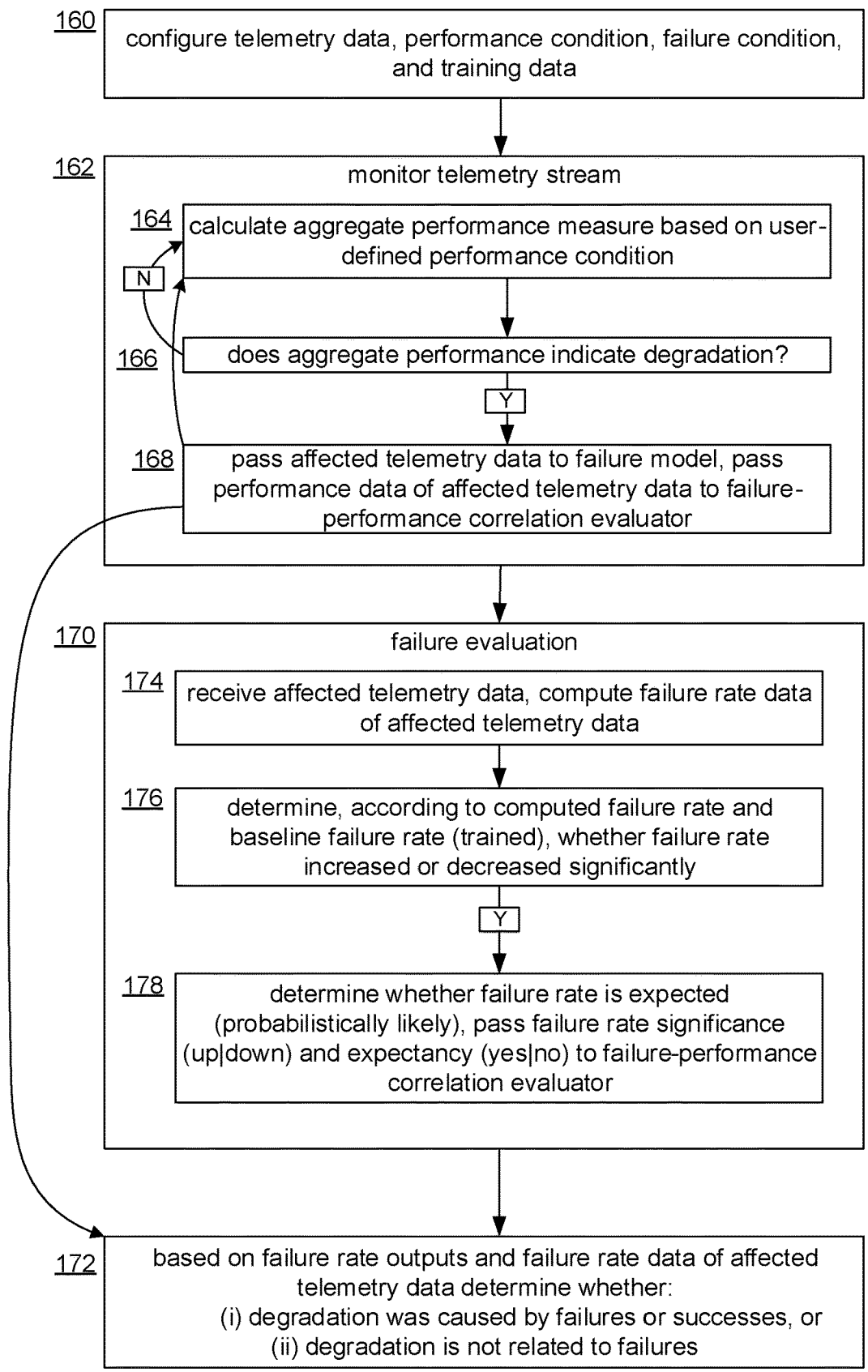
FIG. 3 shows a process for analyzing correlation between telemetry failure rates and performance degradations found in the telemetry data.

FIG. 3 shows a process for analyzing correlation between telemetry failure rates and performance degradations found in the telemetry. At step 160, the system is configured using user interfaces of the user portal. The telemetry source/schema is defined, access to the telemetry data is provided, the performance and failure conditions are specified, the failure model is configured, the performance-significance threshold is set, and so forth.

At step 162 the system begins processing the input telemetry stream to monitor for performance degradation. At step 164, an aggregate performance measure of a portion of the telemetry data is calculated. As noted above, the aggregate performance measure is computed for a telemetry period (and corresponding telemetry subset) such as a sliding window, an extent of continuous degradation, a predefined slice of time, etc. At step 166 the aggregate telemetry performance measure is compared to a degradation condition to determine if the measured telemetry period is experiencing performance degradation. If degradation is not detected, then steps 164 and 166 are repeated as new telemetry data becomes available, as a sliding window moves forward, etc. If degradation is detected, then at step 168 the degraded/affected telemetry data is passed to a failure evaluation step 170 and the performance data related to the degradation (e.g., baseline performance, performance of degraded period, etc.) is passed to a correlation evaluation step 172.

The failure rate is evaluated at the failure evaluation step 170. At step 174 an aggregate failure rate is computed from the degraded telemetry data. The failure rate is computed by determining, for each telemetry event record, whether the user-configured failure/success condition is met. For example, whether a status code or the like indicates a failure. The success/failure statuses of the respective telemetry records are tallied in some fashion to provide the aggregate failure rate for the degraded telemetry data. At step 176, it is determined whether the aggregate failure rate increased or decreased significantly, that is, whether it is outside the user-defined tolerance for deviation from the baseline failure rate. If so, then at step 178 the probability of the failure rate is computed per the statistical model as applied to the affected telemetry data. That is, the output of the statistical model is the probability of getting the current failure rate based on the historical baseline; if the probability is significantly off this might indicate a problem (note that other complex and perhaps non-statistical models can receive a failure rate and return an indication of whether the failure rate is an anomaly rather than return a probability per se). The failure rate significance (up|down|none) and the probabilistic expectancy of the failure rate (yes|no) are passed to the correlation evaluation step 172.

The correlation evaluation step 172 uses a combination of factors to determine whether the degradation period was positively correlated with failure rate, negatively correlated with failure rate, or not correlated with failure rate. In general, the failure rate data from the failure evaluation step and the performance data from the performance evaluation step help decide how to evaluate possible performance-failure correlation. As will be described further below, failure rate parameters inform which performance measurements are to be compared and how they are to be compared. And, the performance measurement comparisons in turn provide correlation conclusions.

Figure 4:
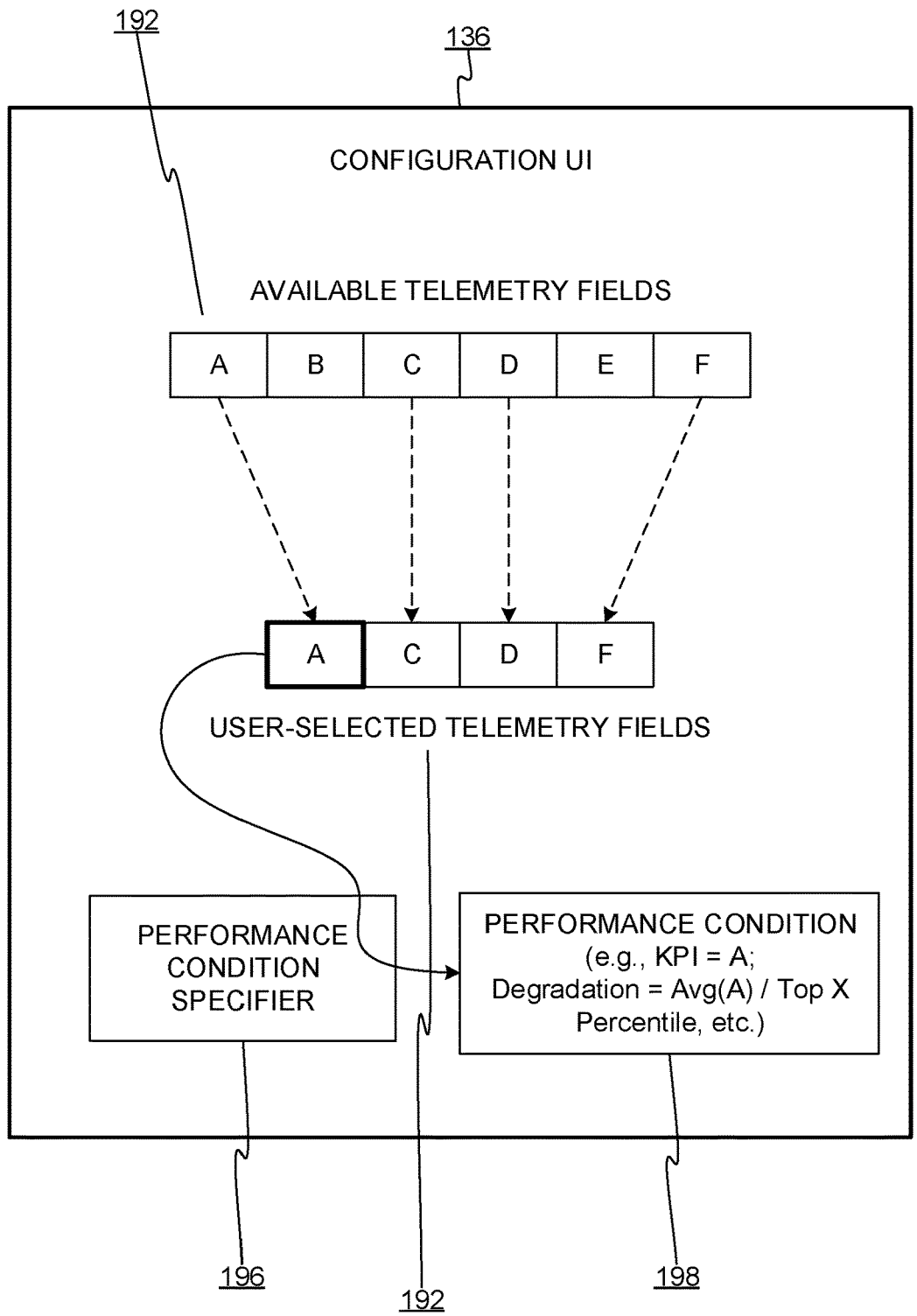
FIG. 4 shows how a configuration user interface is used to configure monitored telemetry fields from among available telemetry fields.

FIG. 4 shows how the configuration user interface 136 is used to configure the monitored telemetry fields 190 from among available telemetry fields 192. Through user interface elements (not shown), the user selects the telemetry source(s). The selected telemetry source(s) includes various available fields (e.g., "A" through "F"). The user interactively selects which telemetry fields will be collected and monitored (e.g., "A", "C", "D", and "F"). The user interface can also be configured to flag which telemetry fields have which purpose. For example, fields may be labeled as failure-related fields, performance-measurement fields, and/or failure predictive fields (fields whose contents may help to statistically model failure probabilities). A performance condition specifier 196 may be displayed to enable interactive definition of the performance condition 198, including the aggregate performance measure or KPI (e.g., duration), and the degradation condition that signals performance degradation, which is generally a function of the baseline KPI and the KPI of telemetry that is being evaluated.

Figure 5:
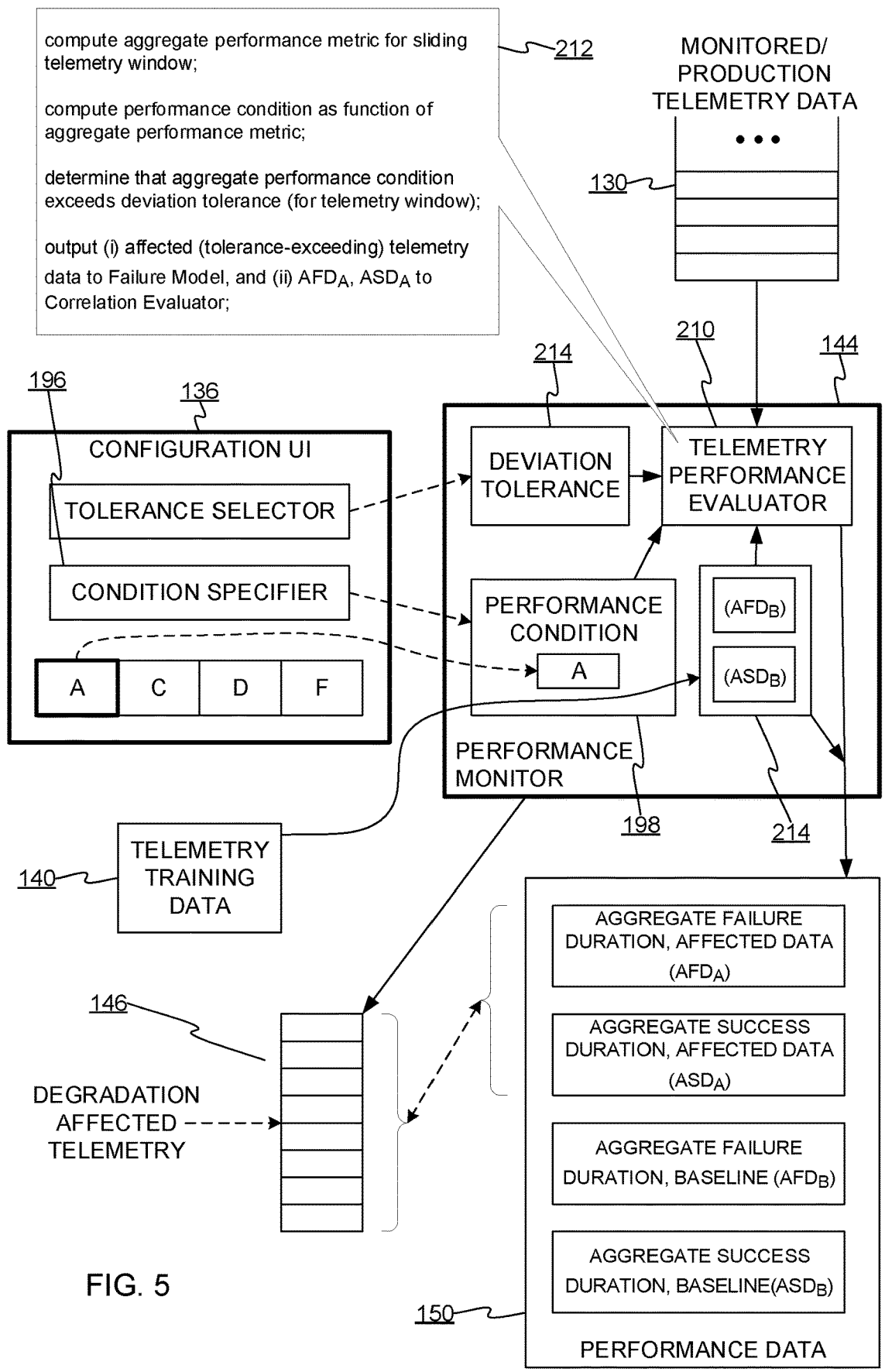
FIG. 5 shows details of a performance monitor.

FIG. 5 shows details of the performance monitor 144. A telemetry performance evaluator 210 performs a process 212. For a portion of the telemetry data 130, an aggregate performance metric is computed (e.g., average event/operation duration). In one embodiment, the performance metric and perhaps baseline performance data 214 are used to compute the performance condition. The baseline performance data 214 may include baseline aggregate failure duration ($AFD_B$) and baseline aggregate success duration ($ASD_B$). The baseline performance data 214 may be computed from the telemetry training data 140 and/or the monitored telemetry stream. In one embodiment, a deviation tolerance 216 is provided to allow some variation in performance. If the aggregate performance condition exceeds the deviation toleration 216, then the corresponding portion of telemetry data is deemed to be degraded. The degraded telemetry data 146 is outputted to the failure model 138, and the performance data 150 (both baseline and for the affected telemetry) is outputted to the failure-performance correlation evaluator 152.

Figure 6:
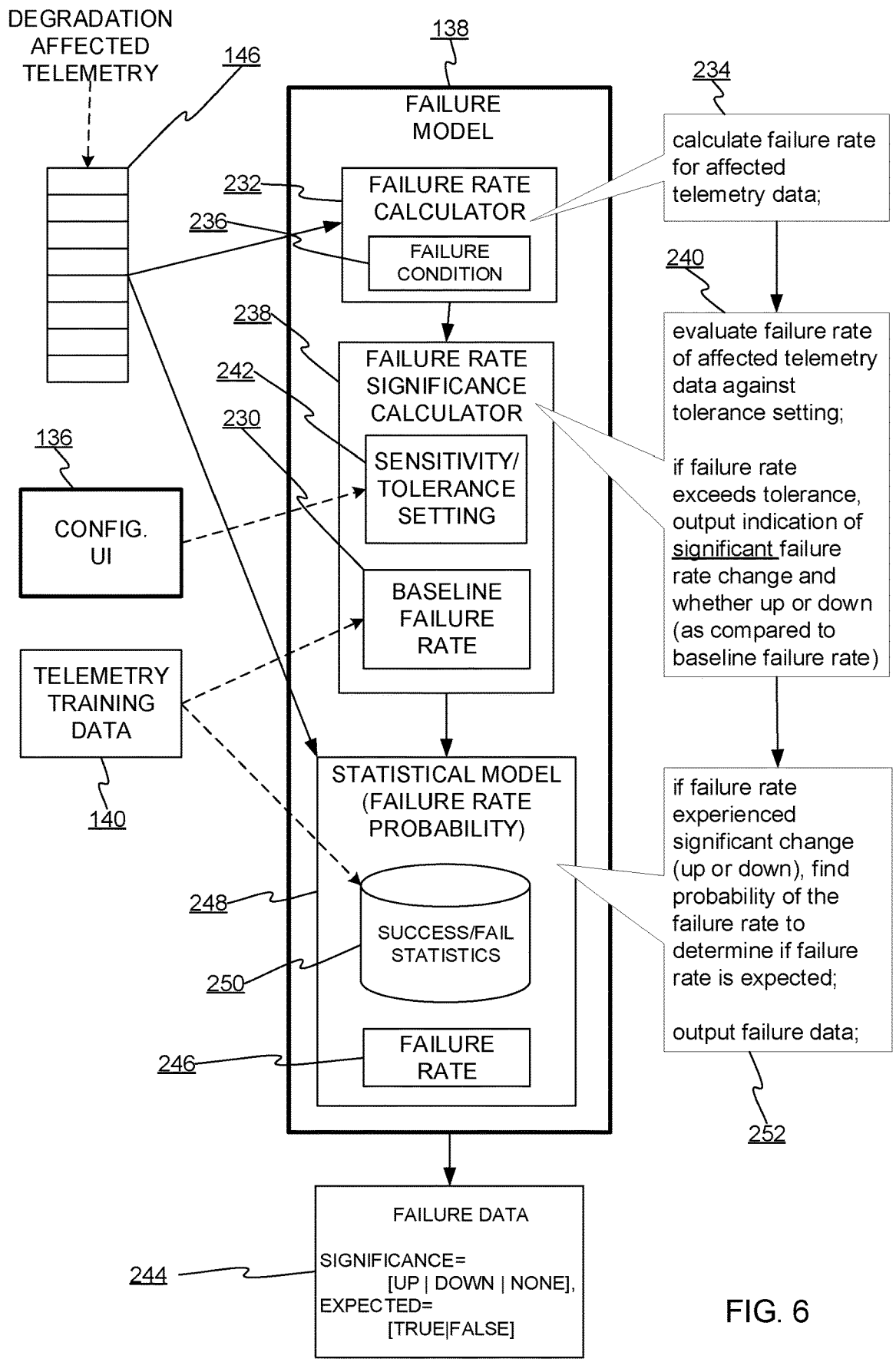
FIG. 6 shows details of a statistical model.

FIG. 6 shows details of the statistical model 138. In one embodiment, the statistical model 138 is invoked in response to a message from the performance monitor 144. In effect, the performance monitor 144 detects when there is a performance problem, and that is when failure data becomes relevant and correlation with performance become possible. Initially, however, the failure model 138 might parse the telemetry training data 140 to determine a baseline failure rate 230. When a performance degradation indication is received, for instance in the form of the degraded telemetry data 146, a failure rate calculator 232 performs a step 234 of calculating a failure rate for the period of degradation. As noted above, failure rate can be any computation that reflects the proportion of failure occurrences. The failure rate can be computed from a failure condition 236 (e.g., properties of telemetry entries, operation return codes) that specifies a formula or condition that, when met by a telemetry record, indicates a failure of an operation represented by the telemetry record. The failure condition may be configured with the configuration user interface 136.

The failure rate is provided to a failure rate significance calculator 238, which performs a step 240 of evaluating the failure rate to see if it deviates from the baseline failure rate 230 by more than the tolerance setting 242 (e.g., lenient, strict). If the failure rate is below the tolerance, then the failure model's failure data 244 indicates that the failure rate changed significantly downward. If the failure rate is above the tolerance, then the failure data 244 will indicate that the failure rate changed significantly upward. If the failure rate did not exceed the tolerance, then the failure data 244 will indicate that there has been no significant change in the failure rate.

If the failure rate has changed significantly, then the failure rate 246 is provided to a statistical model 248. The statistical model 248 uses its statistical history 250 (possibly embodied in the state of a machine learning algorithm) to compute the probability of the failure rate 246 for the degraded telemetry data 146. That is, in the degraded telemetry data 146, the telemetry fields that have been designated as relevant to failure rate probability are used by the statistical model 248 to compute a probability of the failure rate 246 occurring in the degraded telemetry data 146. In other words, at a step 252, the statistical model 248 determines whether the failure rate 246 measured from the degraded telemetry data 146 was, based on past observations, expected or not (e.g., the model-predicted probability of the failure rate was above a certain probability level, such as 50%).

When finished, the failure model 138 outputs two parameters in the failure data 244 that is provided to the failure-performance correlation evaluator 132. First, whether the failure rate significantly increased, significantly decreased, or neither. And second, whether the failure rate was expected or not.

Figure 7:
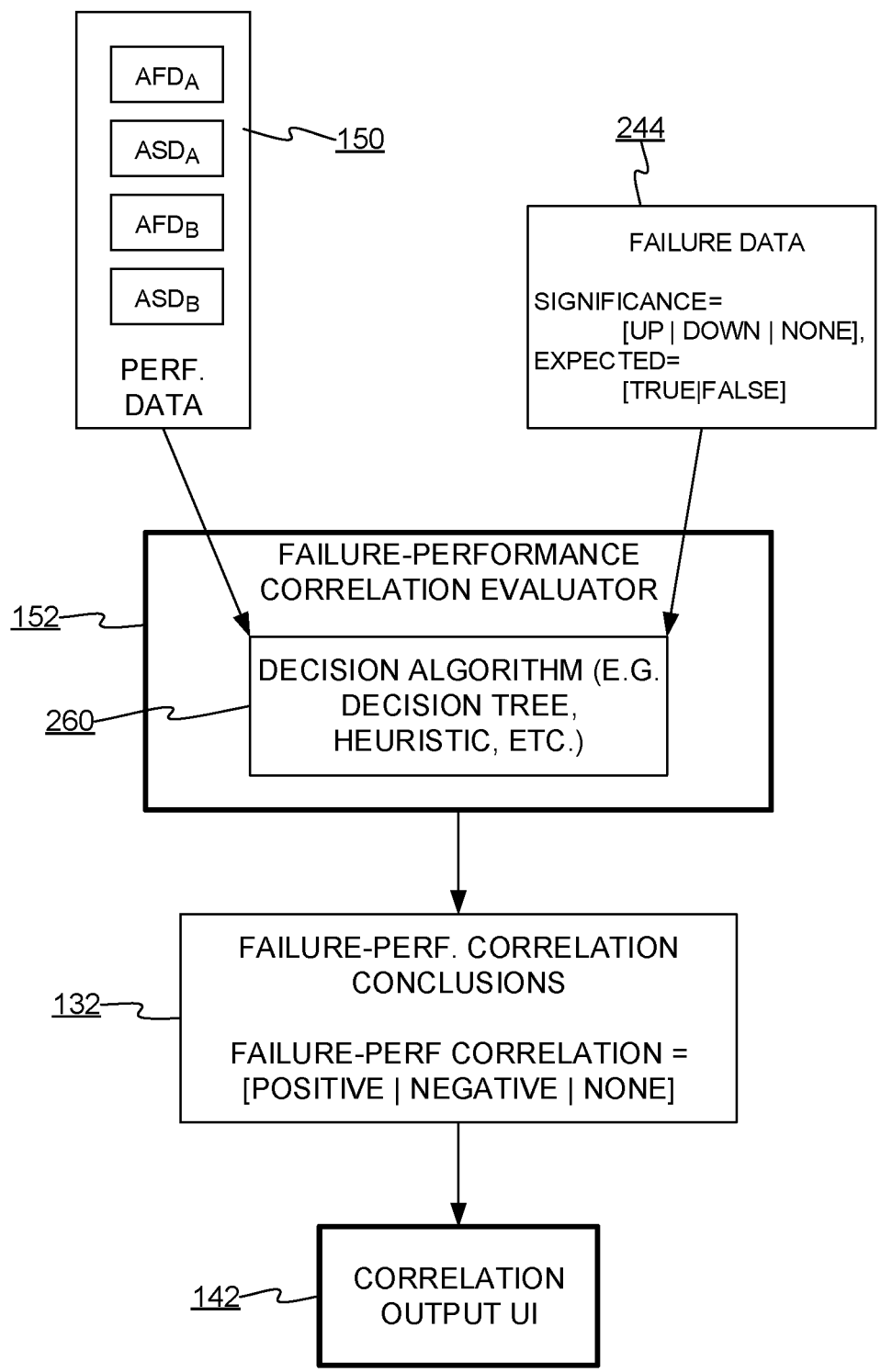
FIG. 7 shows details of a failure-performance correlation evaluator.

FIG. 7 shows details of the failure-performance correlation evaluator 132. As explained above, the correlation evaluator 132 receives performance data 150 (various aggregate performance measures) and failure data 244. A decision algorithm 260 takes the performance data 150 and the failure data 244 as input parameters, and then determines the correlation conclusion 132. The decision algorithm 260 may be any heuristic, decision tree, set of rules, and so forth, that can decide positive and negative correlations between the failure data 244 and the performance data 150. In one embodiment, the correlation conclusion 132 indicates whether there is a positive correlation, a negative correlation, or no correlation. The correlation conclusion 132 may include other data that may be of interest to the user and presented in the correlation output user interface 142. For instance, information about the time period of the degradation, the failure rate, the baseline failure rate, a degree or likelihood of correlation, and so forth, may be reported and displayed in the output user interface 142.

Figure 8:
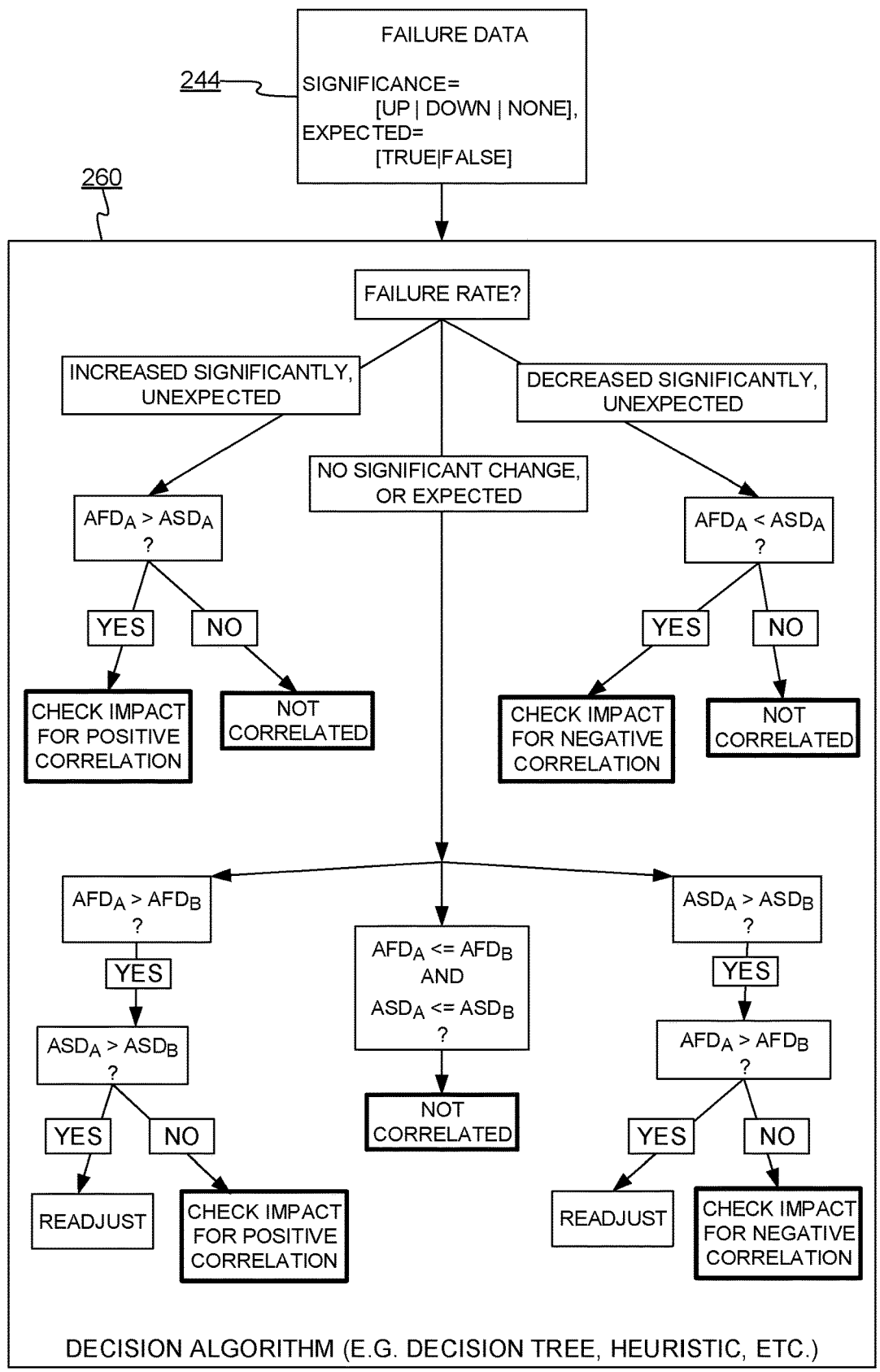
FIG. 8 shows an example of the correlation decision algorithm.

FIG. 8 shows an example of the correlation decision algorithm 260. One of three decision branches of a decision tree are initially selected according to the value of the failure-rate significance parameter. The left branch is chosen if the failure rate increased significantly and was unexpected. The right branch is chosen if the failure rate decreased significantly and was unexpected. The middle branch is chosen if the there was no significant failure rate change or if a significant failure rate change was expected.

If the failure rate increased significantly and was unexpected (left branch), then correlation can be deduced from $AFD_A$ and $ASD_A$. That is, if $AFD_A > ASD_A$ then a positive correlation is possible and will be checked (impact evaluation is discussed below). Otherwise, it can be concluded that there is no failure-performance correlation, which itself is a useful output for a developer or user.

Similarly, if the failure rate decreased significantly and was unexpected (right branch), then correlation can also be deduced from $AFD_A$ and $ASD_A$. That is, if $AFD_A < ASD_A$ then a negative correlation is possible and will be checked for impact. Otherwise, it can be concluded that there is no failure-performance correlation.

If the failure rate did not significantly change (middle branch) or did so expectedly, then several conditions related to baseline and affected telemetry performance—success and failure—can be evaluated for correlation insight. First, if $AFD_A > AFD_B$ and $ASD_A > ASD_B$ then a readjustment is performed (discussed below). Or, if $AFD_A > AFD_B$ and $ASD_A <= ASD_B$ then a positive correlation is possible and will be checked for impact. Second, if $AFD_A <= AFD_B$ and $ASD_A <= ASD_B$ then failure rate and performance degradation are considered to be uncorrelated. Third, if $ASD_A > ASD_B$ and $AFD_A > AFD_B$ then a readjustment is performed (discussed below). Or, if $ASD_A > ASD_B$ and $AFD_A <= AFD_B$ then a negative correlation is possible and will be checked for impact.

To check for the impact of failures on degradation, a predefined impact analysis method may be used. Impact analysis involves evaluating impact of the failure rate, which can be helpful for persons trying to triage problems. Impact analysis can help to decide the KPI for measuring the severity of the issue and for prioritizing the fix. For example, the KPI can be a slowdown in performance or a number of users that fail to login. If the user selected average of the KPI as a performance condition, the impact of the failures on the average value (e.g., response time) can be estimated. In this example, the overall average is calculated 3 times:

(1) using the baseline success duration and the affected time failure ratio and success duration for the affected time;

(2) using the baseline failure duration and the affected time failure ratio and success duration for the affected time; and (3) using the affected time failure rate but with the baseline success and failure ratio.

These help to determine if the increase in failures is causing a slowdown in request duration. This will validate whether an increase in failure is correlated with performance degradation. If 2 out of 3 of these calculations are similar to the affected KPI then there is a correlation. The same approach may be used to check for impact of negative correlation. The "affected KPI" in this example is request performance. The calculations are "similar" in that the change in calculations 1-3 is similar to the change in the performance KPI.

When the decision algorithm 160 indicates that a readjustment is needed, all the values are recalculated with the failure duration or success duration for the affected time with the failure or success duration from the baseline, and the decision algorithm 160 is re-applied.

As noted above, other decision algorithms may be implemented.

Figure 9:
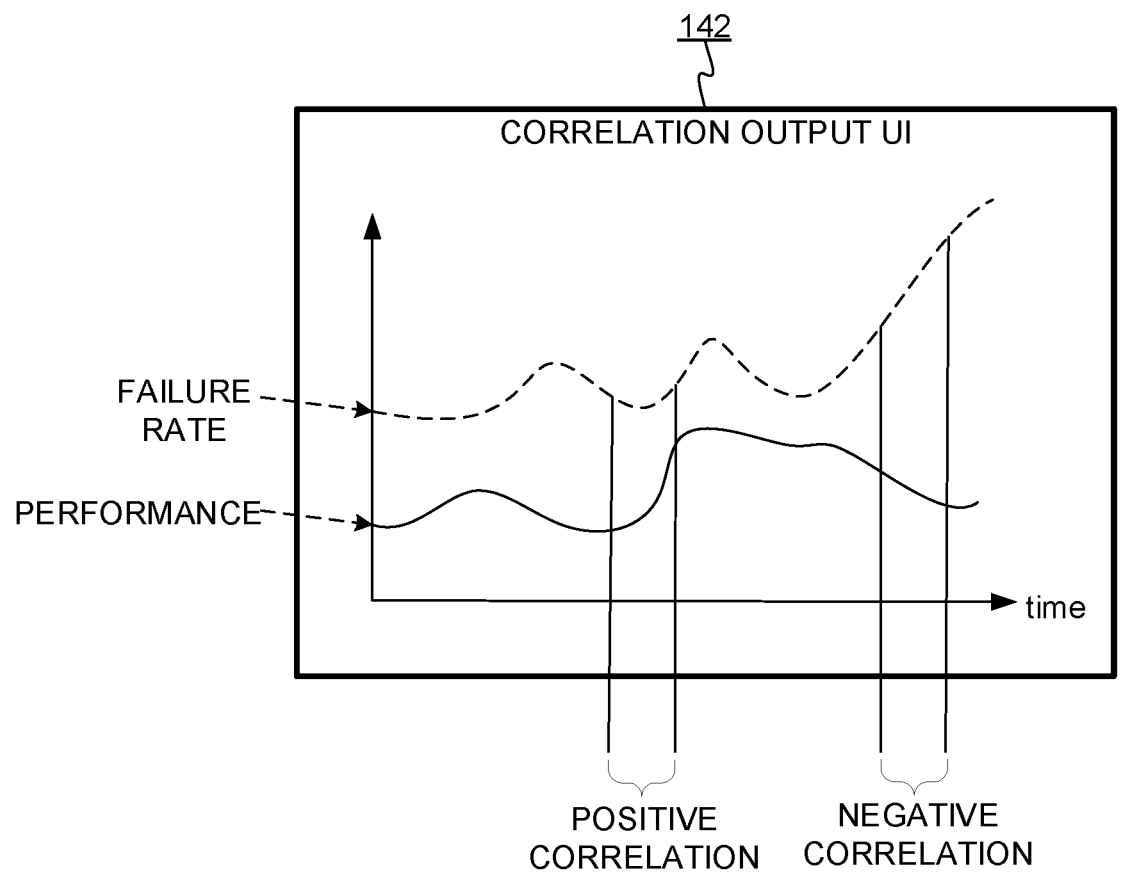
FIG. 9 shows an example implementation of the correlation output user interface.

FIG. 9 shows an example implementation of the correlation output user interface 142. Failure rate and average performance are graphed over time (the baseline performance and failure rate may also be shown). Logic driving the correlation output user interface 142 receives the failure-performance correlation conclusions 132. Each correlation conclusion delineates the time period of the relevant correlation period, and thus the graph can be modified to show periods of positive and negative correlation. The graph may be interactively linked to a data-exploration user interface for viewing the underlying telemetry data. For instance, selection of a marked period of correlation may trigger display of the corresponding telemetry data.

Figure 10:
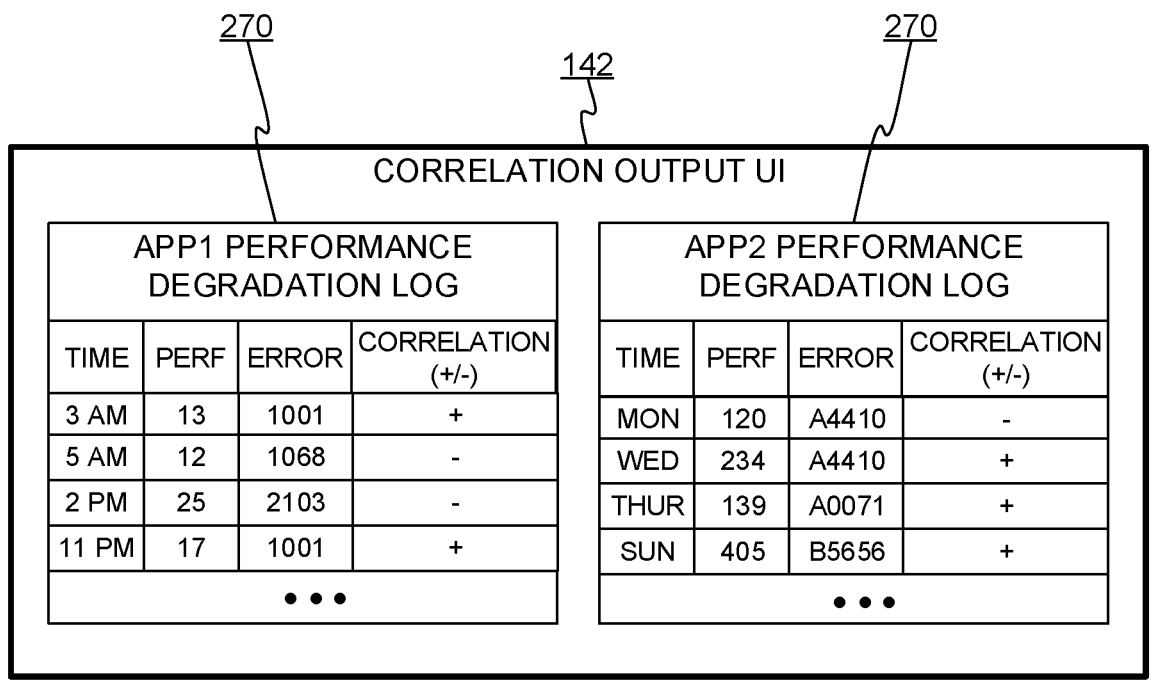
FIG. 10 shows another example of a correlation output user interface.

FIG. 10 shows another implementation of the correlation output user interface 142. In this example, several applications are represented. Each application has its own configuration and model. Each application also has its own correlation results 270, which shows, in chronological order, when correlations were found, what failures they were correlated with, measures of performance during the correlation periods, and which failures were correlated. In other embodiments, the user interface explicitly displays periods of detected degradation performance that were found to have no correlation to failure rate. This information can help a user understand whether the corresponding failure is relevant to performance or should perhaps not be considered as a potential performance factor.

Although performance has been described above as the duration for completing operations, other scalar measures of performance can be used with the same techniques. For example, amount of computation (e.g., CPU time), latency, resource consumption (e.g., bandwidth, memory), or the like may be used instead of completion time.

As noted above, different models and configurations may be provided for different applications, so that the behavior of multiple applications can be studied. Straightforward modification of the techniques used above will allow an application's performance to be checked for correlation with different types of failures. That is, given a definition of performance for an application, a period of detected degradation may be evaluated against telemetry sets, during the period, that correspond to the different failure types.

In some embodiments, the telemetry stream of an application is continuously monitored, and the same model/algorithm for evaluating failure-performance correlation is repeatedly used to identify for the same application and telemetry stream: periods of positive correlation, periods of negative correlation, and periods of no correlation. It is possible that some evaluation periods overlap with others. In another embodiment, a user may define evaluation periods interactively. There is no requirement that the telemetry stream be evaluated as it is being generated or in an "online" manner; correlation evaluations can be made while the application is offline and well after telemetry data has been collected. As used herein "stream" implies an ordered supply of telemetry data.

Figure 11:
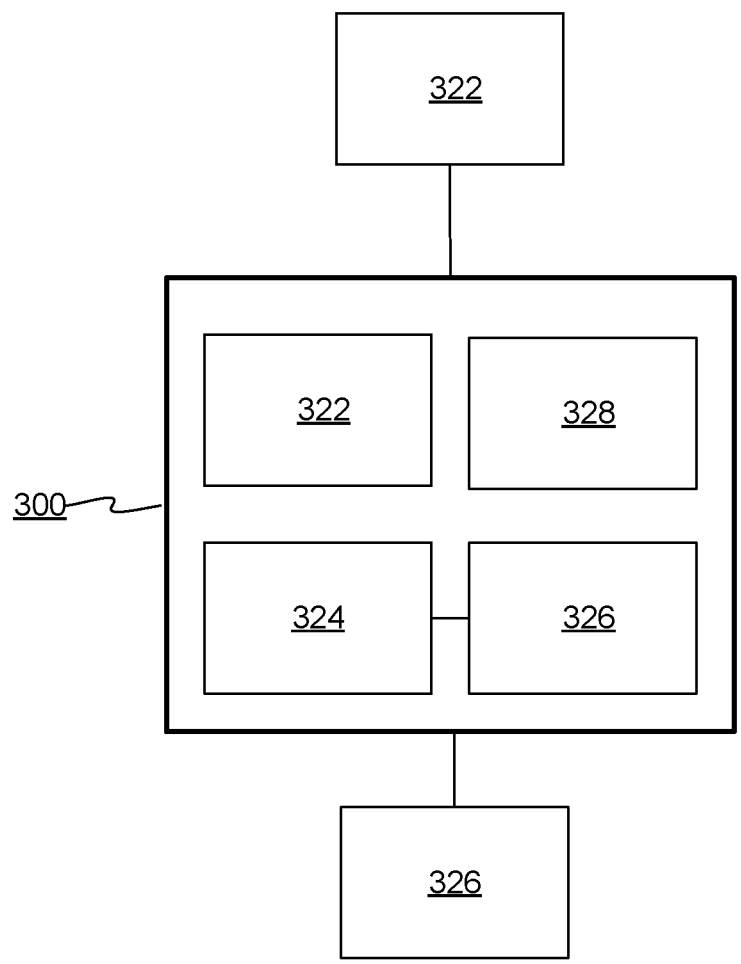
FIG. 11 shows details of a computing device on which embodiments described herein may be implemented.

FIG. 11 shows details of a computing device 300 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 to implement the embodiments described herein.

The computing device 300 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 102 may have any form-factor or may be used in any type of encompassing device. The computing device 102 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 228. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computing devices, the method comprising:
   parsing telemetry data of an application to detect performance degradation periods of the application for respective portions of the telemetry data, the telemetry data comprising records of respective requests for performances of an operation by the application, each record including an indication of success or failure of a request to perform the operation and each record including a measure value that measures performance of the operation;
   training a machine learning module with training data structured in correspondence with structure of the telemetry data, the training data labeled to indicate successes and failures of records therein, wherein the trained machine learning module is configured to receive arbitrary portions of the telemetry stream and compute respective probabilities of aggregate failure rates of the arbitrary portions;
   for each portion of the telemetry data corresponding to a detected performance degradation period, computing, from the records in the portion of the telemetry data: (i) according to the indications of success or failure of the records in the portion, a respective failure rate of failing to perform the operation of the application, (ii) a respective aggregate success-performance measure, the aggregate success-performance measure comprising an aggregation of the measures of the records in the portion having indications of success, (iii) a respective aggregate failure-performance measure of records in the portion having indications of failure, and (iv) a respective probability of the failure rate, wherein the aggregate failure-performance measure comprises an aggregation of the measures of the records in the portion having indications of failure, and wherein the probability of the failure rate is computed by the trained machine learning module processing the portion of the telemetry data and outputting the probability of the failure rate;
   for a first portion corresponding to a first performance degradation period, based on the respectively corresponding aggregate success-performance measure, the respectively corresponding aggregate failure-performance measure, and the respectively corresponding probability of the respectively corresponding failure rate, determining that the first portion is positively correlated with failures of requests to perform the operation, and based thereon either displaying an indication of the positive correlation or automatically reconfiguring the application; and
   for a second portion corresponding to a second performance degradation period, based on the respectively corresponding aggregate success-performance measure, the respectively corresponding aggregate failure-performance measure, and the respectively corresponding probability of the respectively corresponding failure rate, determining that the second portion is negatively correlated with failures of operations, and based thereon either displaying an indication of the negative correlation or automatically reconfiguring the application.

2. A method according to claim 1, further comprising, for a third portion corresponding to a third performance degradation period, based on the respectively corresponding aggregate success-performance measure, aggregate failure-performance measure, and failure rate probability, determining that the second portion is not correlated with failures of requests to perform the operation.

3. A method according to claim 1, further comprising providing a deviation tolerance for the failure rates, and detecting a performance degradation period by determining that an aggregate performance of records therein exceeds the deviation tolerance.

4. A method according to claim 1, further comprising displaying a user interface configured to enable a user to: interactively define the telemetry data, interactively define a failure condition that is used to determine whether a given record corresponds to a success or failure of a corresponding operation performed by the application, and interactively configure the machine learning module.

5. A method according to claim 1, further comprising computing a baseline performance measure of telemetry of successes of the operation and a baseline performance measure of telemetry of failures of the operation, and based thereon determining whether a performance degradation period is negatively correlated, positively correlated, or not correlated with a failure rate of the degradation period.

6. Computer readable storage hardware storing instructions configured to cause a computing device to perform a process, the process comprising:
   receiving a telemetry stream comprised of telemetry records representing respective performances of an operation by an application, each telemetry record comprising a respective measure of performance of an invocation of the operation, each telemetry record comprising a respective failure indication indicating whether a respective invocation of the operation succeeded or failed, and each telemetry record comprising a time corresponding to a respective invocation or completion of the operation;
   training a machine learning module with training data structured in correspondence with structure of the telemetry stream, the training data labeled to indicate successes and failures of records therein, wherein the trained machine learning module is configured to receive arbitrary portions of the telemetry stream and compute respective probabilities of aggregate failure rates of the arbitrary portions;
   parsing the telemetry stream to compute an aggregate performance measure for a segment of the telemetry stream based on the measures of performance in the telemetry records in the segment, the aggregate performance measure computed from records in the segment having a failure indication indicating success and from records in the segment having a failure indication indicating failure;
   based on the aggregate performance measure, determining that the segment corresponds to a period of performance degradation of the application;
   computing an aggregate failure rate for the segment of the telemetry stream from the failure indications thereof, the aggregate failure rate corresponding to a number of telemetry records in the segment having failure indications indicating failure relative to a total number of telemetry records in the segment;

computing an aggregate failure performance measure from the measures of the telemetry records in the segment whose failure indications indicate failures, and computing an aggregate success performance measure from the measures of the telemetry records in the segment whose failure indications indicate success;

computing a probability of the aggregate failure rate by passing, to the trained machine learning module, the telemetry records of the segment, and receiving from the trained machine learning module a probability of the aggregate failure rate computed thereby; and based on the probability of the aggregate failure rate, the aggregate failure performance, and the aggregate success performance, determining whether the segment is positively correlated with failures of the operation during the period of performance degradation and determining whether the segment is negatively correlated with failures of the operation during the period of performance of degradation, and based thereon, either (i) displaying an indication of the positive or negative correlation, or (ii) automatically reconfiguring the application.

7. Computer readable storage hardware according to claim 6, the process further comprising displaying an output user interface that displays graphics indicating the period of performance degradation and whether the period of performance degradation is positively correlated with failures of the operation.

8. Computer readable storage hardware according to claim 6, wherein the process determines that the period of performance degradation is negative correlated with failures.

9. Computer readable storage hardware according to claim 6, wherein the measures of performance comprise respective durations to perform the operation.

10. Computer readable storage hardware according to claim 6, the process further comprising providing a user interface, receiving a failure definition from the user interface, wherein the aggregate failure rate is computed by counting records determined to satisfy the failure definition.

11. A computing device comprising:
processing hardware;
storage hardware storing instructions configured to cause the processing hardware to perform a process comprising:
receiving a telemetry stream comprising entries that respectively represent invocations of an operation by an application, each entry including an indication of success or failure of a request to perform the operation and including a performance measure of performance for the operation;
training a machine learning module with training data comprising training entries structured in correspondence with structure of the entries of the telemetry data, the training entries labeled to indicate successes and failures thereof, wherein the trained machine learning module is configured to receive arbitrary portions of the telemetry stream and compute respective probabilities of aggregate failure rates of the arbitrary portions;
identifying performance-degraded portions of the telemetry stream that respectively correspond to periods of time of degraded performance, wherein a performance-degraded portion is identified by determining, according to the indications of success or failure, that the entries in the performance-degraded portion collectively indicate degraded performance of the application;
computing collective success-performance measures for the performance-degraded portions, respectively, and computing collective failure-performance measures for the performance-degraded portions, respectively, wherein a success-performance measure for a performance-degraded portion is computed from the performance measures in entries thereof that indicate success of the operation, and wherein a failure-performance measure for a performance-degraded portion is computed from the performance measures in the entries thereof that indicate failure of the operation;
computing failure rates for the performance-degraded portions, wherein a failure rate for a performance-degraded portion is computed by determining which entries have indications therein indicate failure of the operation;
computing probabilities of the failure rates, respectively, by passing the corresponding performance-degraded portions to the trained machine learning module;
according to the collective success-performance measures, the collective failure-performance measures, and the probabilities of the failure rates, determining correlations between performance degradations of the application for performance-degraded portions, respectively, and failures of the operation; and
based on the determining of the correlations, displaying indications thereof or automatically reconfiguring the application.

12. A computing device according to claim 11, wherein the performance correlations comprise positive correlations, negative correlations, and no-correlations, and wherein some performance-degraded portions are determined to have positive correlations with failures of the operation, other performance-degraded portions are determined to have negative correlations with failures of the operation, and yet other performance-degraded portions are determined to have no-correlations with failures of the operation.

13. A computing device according to claim 11, wherein the instructions are further configured to provide a user portal configured to respond to user inputs directed thereto by:
configuring the telemetry stream,
configuring a performance condition used to obtain performance measures of the operation from the entry, and
configuring a failure condition used to determine which entries correspond to failures of the operation.

14. A computing device according to claim 11, the process further comprising:
computing a baseline success-performance measure that corresponds to baseline successful performances of the operation, computing a baseline failure-performance measure that corresponds to baseline failed performances of the operation, and determining the correlations further according to the baseline measures.

15. A computing device according to claim 11, the process further comprising displaying graphics indicating which performance-degraded portions are determined to be positively correlated with failures of the operation and which performance-degraded portions are determined to be negatively correlated with failures of the operation.

* * * * *